United States Patent [19]
Hashimoto et al.

[11] Patent Number: 5,706,281
[45] Date of Patent: Jan. 6, 1998

[54] DATA TRANSFER SYSTEM

[75] Inventors: Shin-ichi Hashimoto; Yuuji Kimura, both of Yokohama; Tetsuya Kawahara, Fujisawa; Itaru Nonomura, Tokyo; Takahiro Yamada, Yokohama; Kazuhiro Fujisaki, Ebina, all of Japan

[73] Assignee: Hitachi, Ltd., Tokyo, Japan

[21] Appl. No.: 490,489

[22] Filed: Jun. 14, 1995

[30] Foreign Application Priority Data

Jun. 14, 1994 [JP] Japan .................................. 6-131961

[51] Int. Cl.$^6$ ...................................................... H04J 3/22
[52] U.S. Cl. .................... 370/252; 370/465; 370/470
[58] Field of Search ............................ 370/17, 60, 60.1, 370/79, 80, 82, 84, 94.1, 94.2, 252, 465, 468, 470, 471

[56] References Cited

U.S. PATENT DOCUMENTS 4,771,391  9/1988  Blasbalg .................................. 370/85.2
5,477,531  12/1995  McKee et al. ........................... 370/60

FOREIGN PATENT DOCUMENTS 3-124139   5/1991   Japan .
3-124140   5/1991   Japan .
4-82437    3/1992   Japan .
4-263545   9/1992   Japan .
4-320130   11/1992  Japan .
4-372242   12/1992  Japan .

*Primary Examiner*—Melvin Marcelo
*Attorney, Agent, or Firm*—Antonelli, Terry, Stout & Kraus, LLP

[57] ABSTRACT

A data transfer system for data transfer between a plurality of information processors connected to a communication line comprises at least one specified sending information processor and one specified receiving information processor. The sending information processor determines the block size in which original data to be sent to the receiving information processor is to be divided and the transfer time interval at which data blocks are to be transferred, divides the original data to be sent into data blocks of the determined block size, and sends the data blocks to the receiving information processor at the determined transfer time interval. The receiving information processor receives and reconstructs the data blocks sent thereto to obtain the original data.

7 Claims, 13 Drawing Sheets

FIG. 15

| | 22 | |
|---|---|---|
| 221 | | 222 |
| NOT LESS THAN 90% | | 1Mb/s |
| NOT LESS THAN 70% AND LESS THAN 90% | | 2Mb/s |
| NOT LESS THAN 50% AND LESS THAN 70% | | 3Mb/s |
| NOT LESS THAN 30% AND LESS THAN 50% | | 4Mb/s |
| LESS THAN 30% | | 5Mb/s |

FIG. 16

| | 23 | |
|---|---|---|
| 231 | | 232 |
| NOT LESS THAN 40 | | 4Mb/s |
| NOT LESS THAN 30 AND LESS THAN 40 | | 3Mb/s |
| NOT LESS THAN 20 AND LESS THAN 30 | | 2Mb/s |
| NOT LESS THAN 10 AND LESS THAN 20 | | 1Mb/s |
| LESS THAN 10 | | 0.5Mb/s |

DATA TRANSFER SYSTEM

BACKGROUND OF THE INVENTION

1. Field of the Invention

The present invention relates to a data transfer system for interconnecting a plurality of information processors by a communication line to enable the transfer of multimedia data representing moving pictures, still pictures and sounds between the plurality of information processors.

2. Description of the Related Art

Recently, the use of communication network systems for sending and receiving required data has progressively spread. The communication network systems interconnect a personal computer (hereinafter abbreviated to "PC") or a workstation (hereinafter abbreviated to "WS") by various communication lines such as a public data network or a local area network (hereinafter abbreviated to "LAN") to transfer multimedia data provided by multiple media, such as data representing moving pictures, still pictures and sounds.

Problems arise in introducing an application program (hereinafter referred to as "multimedia AP"), such as an electronic mail program for handling multimedia data, into an existing LAN. The conventional AP, as compared with the multimedia AP, does not need to transfer a large quantity of data and the traffic does not increase to an extent exceeding the data transfer capacity of the network even if a plurality of users request the use of the network simultaneously. When such a network is used for transferring a large quantity of multimedia data, the traffic increases greatly and, consequently, the transfer of the data is delayed, which deteriorates the data communicating performance of the existing AP. Delay in transferring data is a serious problem in data communication in which severe restrictions are placed on data transfer time, such as real-time data communication, and the system is unable to function so as to meet user's demand. Techniques proposed to solve such a problem are disclosed in Japanese Patent Laid-open (Kokai) Nos. 4-263545 and 4-82437.

The technique disclosed in Japanese Patent Laid-open (Kokai) No. 4-263545 prevents long-time occupation of a communication line by a data file of mass data when transmitting the data file. When the data length of a data file to be sent from a sending terminal to a receiving terminal exceeds a predetermined length, the data file to be sent is divided into a plurality of data blocks, and the data blocks are sent out at time intervals in a plurality of times.

The technique disclosed in Japanese Patent Laid-open (Kokai) No. 4-82437 adds header information indicating whether or not the data needs to be sent in a real-time mode, and sends the data in a packet transmission mode according to the urgency of the data indicated by the header information in a time zone where the traffic is small.

The technique disclosed in Japanese Patent Laid-open (Kokai) No. 4-263545 increases opportunities of transferring data sent out by other information processors by a widely used communication method, such as the Ethernet, in time intervals between periods for the transfer of data blocks, and effectively avoids congestion due to long-time occupation of a communication line by one of the terminals. However, when an information processor for transferring mass data for which real-time processing is not very important, such as video mail, is added to a communication method operating in an environment using APs of which a real-time communication ability is required, there is the possibility that the communication ability of the communication system is deteriorated due to delay in transferring data between the existing information processors. Nothing about the data size for dividing data is mentioned in the description of this known technique.

The technique disclosed in Japanese Patent Laid-open (Kokai) No. 4-82437 is based on the premise that all the terminals connected to the communication line of a communication system operate in compliance with a rule that the allowable time of arrival indicating the limit of time of arrival of data at the receiving station is to be added to the data when sending out the data. Therefore, when this method is introduced into an existing communication network, such as the Ethernet, transfer priority is given irrationally to data sent out by a terminal that sends out data without complying with the aforesaid rule. Since this known technique takes no account of inter network formed by interconnecting networks by routers, there is the possibility, as mentioned above, that transfer priority is given to data sent out by networks other than a network complying with the aforesaid rule. Furthermore, the software and the hardware for realizing network drivers and protocol processing units of all the existing terminals must be replaced with new ones to introduce the aforesaid rule into all the terminals of the network, which is costly and difficult.

SUMMARY OF THE INVENTION

The present invention has been made in view of those problems and it is therefore an object of the present invention to provide a data transfer system capable of transferring newly added mass data without affecting the transfer of data to be transferred in a real-time mode by the terminals of an existing communication system when newly introducing an application for transferring mass data, such as video mail data, into the existing communication system.

Another object of the present invention is to provide a low-cost data transfer system capable of solving the foregoing problems in the prior art and of being easily introduced into an existing communication system.

With the foregoing object in view, the present invention provides a data transfer system formed by interconnecting a plurality of information processors by a communication line to enable data transfer between the information processors interconnected by the communication line.

The data transfer system has at least one data transfer set of one specified sending information processor among the information processors, and one specified receiving information processor among the information processors, and the sending information processor comprises a block size determining means for determining a block size in which original data to be sent to the receiving information processor is to be divided into blocks, on the basis of the transmission rate of the communication line and predetermined allowable delay time which is allowable time for which data communication is allowed to be delayed so as to guarantee the predetermined allowable delay time, a transfer time interval determining means for determining a transfer time interval at which data blocks are to be transferred, on the basis of the block size determined by the block size determining means, transmission bandwidth to be used for sending the data blocks of the block size and the number of simultaneously active data transfer sets each of a sending information processor and a receiving information processor, and a dividing/transmitting means for dividing the original data to be sent into data blocks of the block size determined by the block size determining means and sending the data blocks to the receiving information processor at the transfer time intervals determined by the transfer time interval determining means.

The receiving information processor has a block receiving means for receiving the data blocks divided and transmitted by the dividing/transmitting means and reconstructing the original data.

The block size determining means may determine the block size dp (byte) in which original data to be sent to the receiving information processor is to be divided, by using an expression: dp=(VL×tc)/8, where VL (bit/sec) is the transmission rate of the communication line, and tc (sec) is allowable delay time.

The transfer time interval determining means may determine the transfer time interval td (sec) at which the data blocks are to be transmitted, by using an expression: td=(8× dp×C)/Vd, where dp (byte) is block size, Vd (bit/sec) is transmission bandwidth to be used for transmitting the data blocks of the block size and C is the number of simultaneously active data transfer sets, each of a sending information processor and a receiving information processor.

When transmitting an original data, such as video mail, the dividing/transmitting means of the sending information processor divides the original data into data blocks of the block size determined by the block size determining means and transmits the data blocks to the receiving information processor in a plurality of times at transfer time intervals determined by the transfer time interval determining means. The receiving information processor receives the data blocks from the dividing/transmitting means and reconstructs the data blocks in the original data.

A delay monitoring means monitors the delay in data transfer, a transfer time interval adjusting means increases the transfer time interval to reduce the load on the network when the delay in data transfer increases beyond the allowable delay time. The transfer time interval adjusting means reduces the transfer time interval to enhance transfer efficiency when the delay in data transfer decreases. The transmission bandwidth necessary for the transfer time interval determining means to determine transfer time interval may be determined beforehand by, for example, the user.

According to the present invention, the original data is divided into data blocks of a block size determined so as to guarantee the data communication between the existing information processors in a real-time mode, and the data blocks are transferred at transfer time interval determined so as to guarantee the upper limit of the band for transmitting the data block. Accordingly, the possibility of delaying the transfer of data required to be transferred between the existing information processors of an existing communication system in a real-time mode is reduced to the least extent when newly introducing an application for transmitting a video mail, or the like, having mass data into the existing communication system, and the mass data can be transmitted without affecting the communication functions of the existing communication system. The effect of the present invention can be exerted by additionally incorporating an apparatus for transmitting mass data into the existing communication system and providing only the additional apparatus with the aforesaid means in accordance with the present invention. Therefore, the present invention can be very easily introduced into the existing communication system.

Thus, the present invention divides mass data to be transmitted into data blocks of a size determined so as to guarantee an allowable delay time, and transmits the data blocks at transfer time intervals determined so as to guarantee the upper limit of the transmission bandwidth, so that mass data can be transferred efficiently without adversely affecting data transfer between the existing information processors of the communication system.

BRIEF DESCRIPTION OF THE DRAWINGS

The above and other objects, features and advantages of the present invention will become more apparent from the following description taken in connection with the accompanying drawings, in which:

FIG. 15 is a table to be used by the data transfer system in the second embodiment; and FIG. 16 is a table to be used by the data transfer system in the third embodiment.

DETAILED DESCRIPTION OF THE PREFERRED EMBODIMENTS

This invention will be described in further detail by way of example with reference to the accompanying drawings.

First Embodiment

Figure 2:
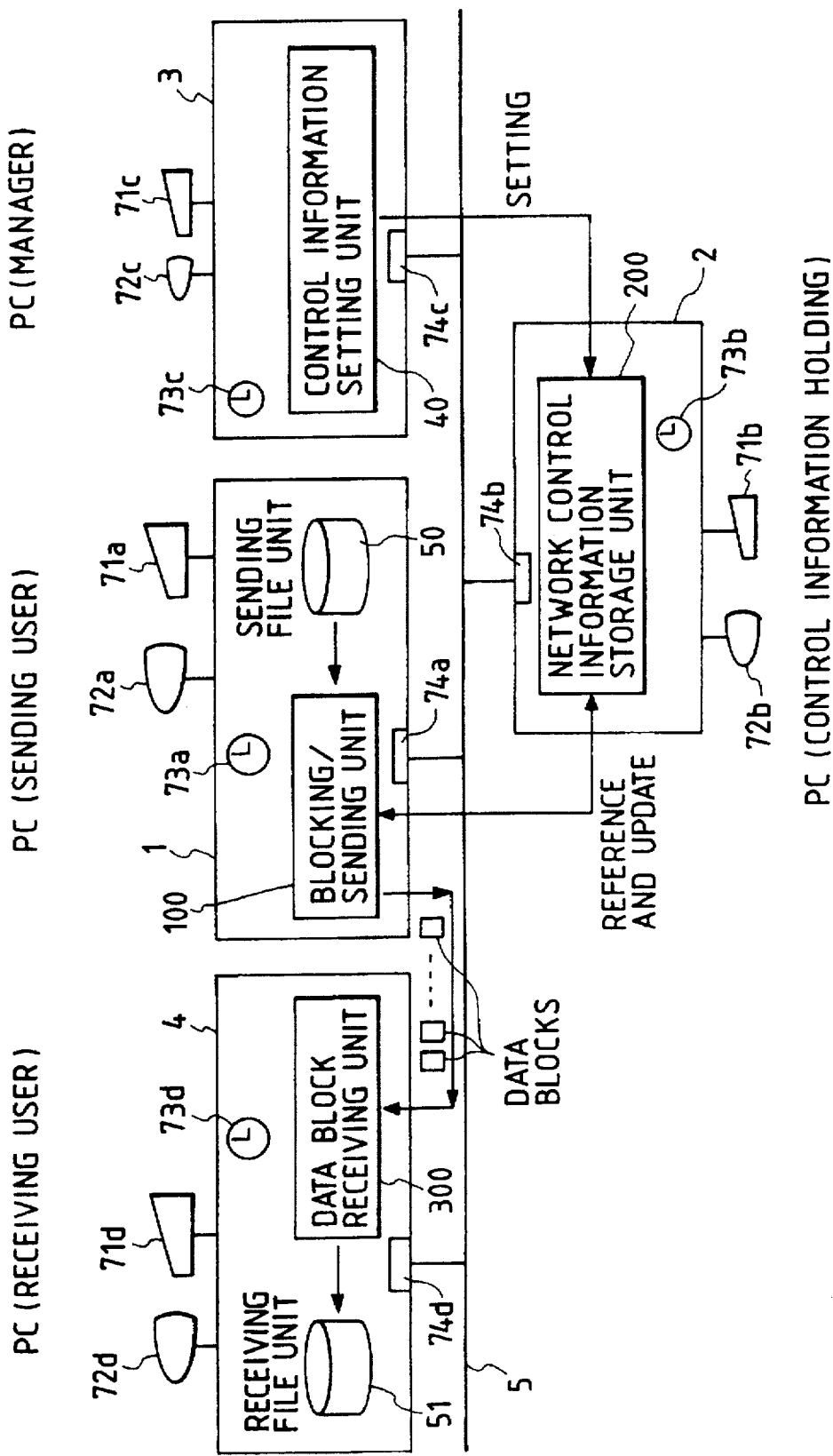
FIG. 2 is a block diagram of the data transfer system in the first embodiment according to the present invention.

Referring to FIG. 2, a data transfer system in a first embodiment according to the present invention comprises a sending terminal 1 capable of dividing mass data into a plurality of data blocks and of transmitting the data block, a receiving terminal 4 capable of receiving the transmitted data block and of reconstructing the mass data by integrating the data blocks, a terminal 2 capable of storing network control information to be used for dividing the mass data into the data blocks and transferring the data blocks, which will be described later, a terminal 3 to be used by a manager who manages the network control information for setting and changing, a communication line 5 interconnecting those terminals 1, 2, 3 and 4 to enable the terminals 1, 2, 3 and 4 to exchange data. The sending terminal 1 and the receiving terminal 4 constitute a data transfer set for transferring mass data. Although only one data transfer set is shown in FIG. 2 for simplicity, generally, the data transfer system is provided with a plurality of data transfer sets. The communication line 5 may be a communication means, such as a coaxial cable or an optical fiber cable, for a communication network, such as a LAN.

The configurations of the terminals will be described hereinafter in terms of the principal components thereof.

The sending terminal 1 comprises an input unit 71a, an output unit 72a, a clock 73a for providing the current time, a sending file unit 50 for storing sending data and the like, a line accessing unit 74a for gaining access to the communication line 5, and a dividing/sending unit 100 which fetches data to be sent out from the sending file unit 50, determines a block size, divides the data into data blocks of the block size and sends out the data blocks. The input unit 71a is a keyboard, a mouse, or the like. The output unit 72a may be a printer, a display, or the like. Commands are given through the input unit 71a to the sending terminal 1 to send out the data blocks. Information necessary for the user, such as the block size, is given to the output unit 72a. The dividing/sending unit 100 comprises a central processing unit (abbreviated as "CPU"), a read-only memory (abbreviated as "ROM") and a read/write memory (abbreviated as "RAM"), which are not shown in FIG. 2. The functions of the dividing/sending unit 100, which will be described later, are realized according to software to be executed by the hardware. Programs to be executed by the CPU are stored in the sending file unit 50. Sender control information 21 is stored in the sending file unit 50. The sender control information 21 can be set by operating the input unit 71a.

The receiving terminal 4 comprises an input unit 71d, an output unit 72d, a clock 73d for providing the current time, a receiving file unit 51 for storing received data and such, a line accessing unit 74d for gaining access to the communication line 5, and a data block receiving unit 300 which carries out at least processes for receiving data blocks, integrating the data blocks to reconstruct the data, and storing the reconstructed data in the receiving file unit 51. The input unit 71d may be a keyboard, a mouse, or the like. The output unit 72d may be a printer, display, or the like. Commands are given through the input unit 71d to activate the functions of the receiving terminal 4. The output unit 72d provides information necessary for the user, such as the size of the reconstructed data. The receiving terminal 4 is similar in configuration to the sending terminal 1. The functions of the data block receiving unit 300, which will be described later, are realized according to software to be executed by hardware. Programs to be executed by a CPU, not shown, are stored in the receiving file unit 51.

The terminal 2 comprises an input unit 71b, an output unit 72b, a clock 73b for providing the current time, a line accessing unit 74b for gaining access to the communication line 5, and a network control information storage unit 200 for storing network control information 20, which will be described later. The input unit 71b may be a keyboard, a mouse, or the like. The output unit 72b is a printer, a display, or the like. Commands are given through the input unit 71d to display, for example, the network control information 20 stored in the network control information storage unit 200 on the output unit 72b. The network control information 20 may be set by operating the input unit 71d.

A band controller 600 comprises a CPU, ROM and RAM, which are not shown in FIG. 2. The functions of the band controller 600, which will be described later, are realized according to software to be executed by the hardware. The terminal 3 is connected to an external storage device, not shown, for storing programs to be executed by a CPU. The terminal 3 comprises an input unit 71c, an output unit 72c, a clock 73c for providing the current time, a line accessing unit 74c for gaining access to the communication line 5, and a control information setting unit 40 for setting the network control information 20 in the network control information storage unit 200. The input unit 71c may be a keyboard, a mouse, or the like. The output unit 72c is a printer, display, or the like. The control information setting unit 40 comprises a CPU, a ROM storing programs, a RAM and electronic devices, such as CMOS devices. The functions of the terminal 3 are realized according to software to be executed by the hardware.

When the network control information 20 is entered by the manager of the communication system by operating the input unit 71d, the control information setting unit 40 sets the network control information 20 in the network control information storage unit 200 and the output unit 72c displays the contents of the network control information 20.

In the data transfer system shown by way of example in FIG. 2, the sending terminal 1 is provided with the dividing/sending unit 100 and has only a sending function, and the receiving terminal 4 is provided with the data block receiving unit 300 and has only a receiving function. However, in a practical data transfer system, it is usual that a single terminal sends and receives data blocks. Therefore, it is usual to provide the dividing/sending unit 100 and the data block receiving unit 300 in each terminal capable of transferring mass data instead of providing the dividing/sending unit 100 and the data block receiving unit 300 in different terminals, respectively. The network control information storage unit 200 and the control information setting unit 40 may be included in any terminal provided that the terminal is connected to the communication line 5.

Figure 3:
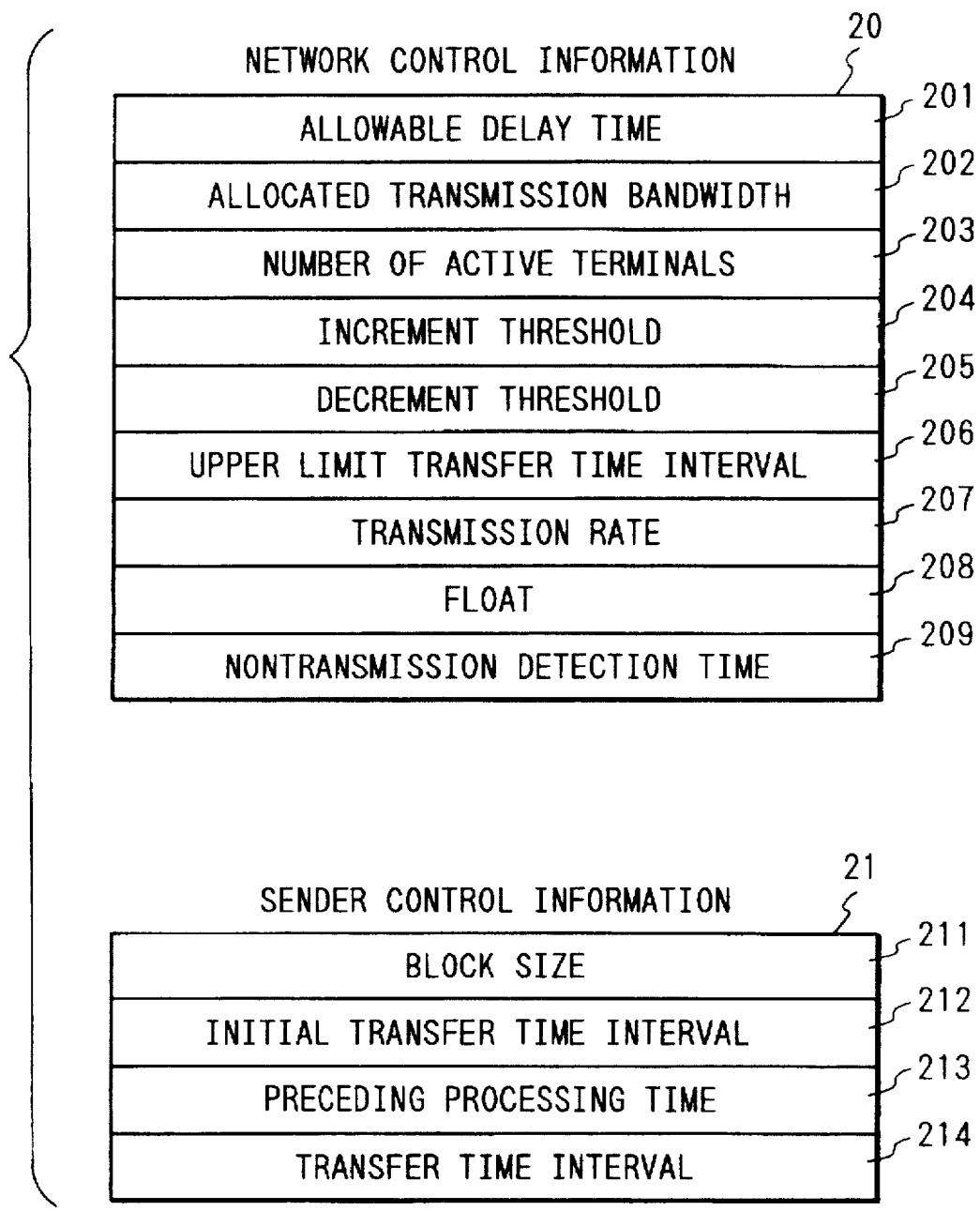
FIG. 3 is a diagram of control data to be handled by the data transfer system of FIG. 2.

Referring now to FIG. 3 showing control data necessary for the data dividing and transferring operation of the data transfer system in the first embodiment, the network control information 20 is stored in the network control information storage unit 200 of the terminal 2. The network control information 20 includes allowable delay time 201, an allocated transmission bandwidth 202, the number 203 of active terminals, a threshold 204 of processing time increment, a threshold 205 of processing time decrement, an upper limit transfer time interval 206, a transmission rate 207, a float 208 and a nontransmission detection time 209, which are used in dividing data and transmitting data blocks. Concretely, the pieces 201, 202, 203, 207, 208 and 209 of information are used in determining a block size and a transfer time interval, and the pieces 204, 205 and 206 of information are used to adjust the load on the communication system. A block size determining process, a transfer time interval determining process and a process for adjusting the load on the communication system will be described later.

The allowable delay time 201 is the maximum delay time by which data communication is allowed to be delayed to secure data transfer through the communication line 5 between the existing terminals in a real-time mode. The allocated transmission bandwidth 202 is a transmission bandwidth allocated to the sending terminal 1 connected to the communication line 5 and capable of dividing data into data blocks and sending out data blocks. The number 203 of active terminals is the number of data transfer sets of terminals currently carrying out data dividing and transfer processes through the communication line 5. The threshold 204 of processing time increment is the maximum increment in the processing time for transferring one data block. When the processing time increases by a time greater than the maximum increment, it is decided that data transfer is delayed. The threshold 205 of processing time decrement is the maximum decrement in the processing time for transferring one data block. When the processing time decreases by a time greater than the maximum decrement, it is decided that the transfer delay is reduced. The upper limit transfer time interval 206 is the maximum transfer time interval allowed for data block transfer. The transmission rate 207 is a value uniquely dependent on the communication line used for data transmission or a protocol for data transmission. The float 208 is a time allowed for processing overhead. The nontransmission detection time 209 is an interframe gap necessary for detecting a gap between data being transferred on the communication line.

The allowable delay time 201 may be the minimum value among the values obtained by subtracting a time interval for which the communication line is occupied actually for data transfer from the allowable delay time for securing real-time communication between the existing terminals on the communication line 5. For example, when a communication process AP1 (AP: application program) requiring the transfer of 10 Mb (megabits) of data between a plurality of terminals in 10 sec and a communication process AP2 requiring the transfer of 10 Mb of data between a plurality of terminals in 9 sec are to be executed through a communication line having a transmission rate of 10 Mb/sec, the allowable delay time for the communication process AP1 is 9 sec and the allowable delay time for the communication process AP2 is 8 sec, because 10 Mb of data occupies the communication line for 1 sec, and hence the allowable delay time 201 for the network is 8 sec.

Preferably, the sender control information 21 is held in the sending file unit 50 of the sending terminal 1. However, the sender control information 21 may be held in any one of the terminals connected to the communication line 5. The sender control information 21 includes block size 211, initial transfer time interval 212, processing time 213 of the preceding processing cycle and transfer time interval 214. The block size 211 is a data size in which mass data is divided. The processing time 213 of preceding processing cycle is time taken for transferring one data block in the preceding data block transfer and is updated every time one data block is transferred. The transfer time interval 214 is a time interval between processes for transferring successive data blocks. The initial transfer time interval 212 is the initial value of the transfer time interval 214 at the start of data transfer, which, usually, is "0". The processing time 213 of preceding processing cycle is time between the start of the sending terminal for data transfer and the return of an ACK (acknowledge) signal provided by the receiving terminal upon the reception of the transmitted data to the sending terminal.

As mentioned above, the network control information 20 and the sender control information 21 may be stored in data tables or data files in any one of the terminals connected to the communication line 5 so as to allow the terminals to gain access thereto. Processes for the determination and change of the network control information 20 and the sender control information 21 will be explained in the following description whenever necessary.

Figure 1:
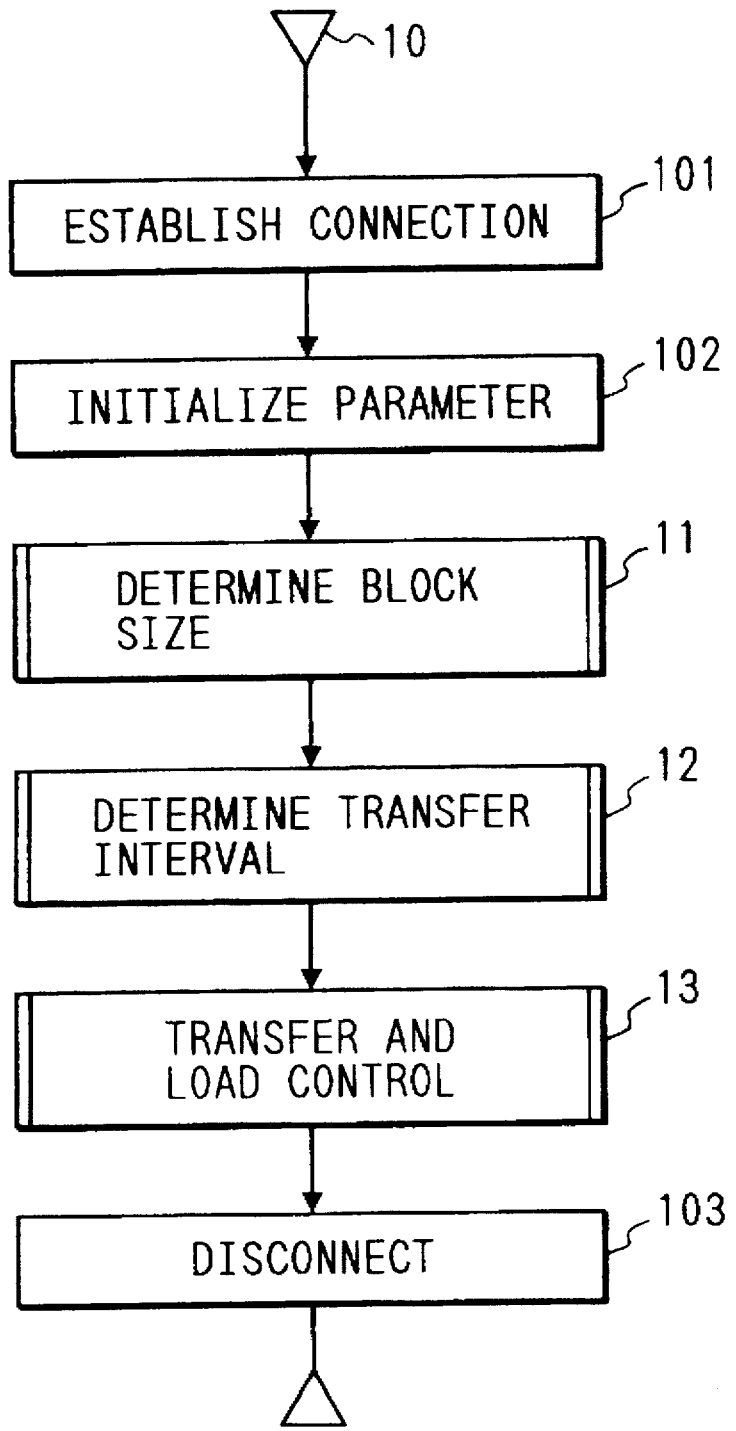
FIG. 1 is a flow chart of a dividing/transmitting process to be executed by a data transfer system in a first embodiment according to the present invention.

Referring to FIG. 1 showing a process 10 to be executed by the dividing/sending unit 100 of the first embodiment, the process 10 is started when necessary information is given to the dividing/sending unit 100 by entering a parameter, such as a file name stored in the sending file unit 50 by operating the input device. The process 10 may be started when a specific command is given to the dividing/sending unit 100. In step 101, the dividing/sending unit 100 is connected to the data block receiving unit 300 of the receiving terminal 4 for data transfer, and the number 203 of active terminals among the network control information 20 is incremented by one because the data transfer set of the terminals 1 and 4 is added to the data transfer sets of terminals for data block transfer. In step 102, the processing time 213 of preceding processing cycle among the sender control information 21 is set to "0" for initialization. In step 11, a block size determining routine (hereinafter referred to as "process 11") is executed to determine block size of data to be sent, i.e., size of one data block. In step 12, a transfer time interval determining routine (hereinafter referred to as "process 12") is executed to determine a time interval between the transmission of one data block and that of the next data block. In step 13, a transfer/load control routine (hereinafter referred to as "process 13") is executed to transfer data blocks so that the load on the network may not exceed the upper limit load. In step 103, the dividing/sending unit 100 of the sending terminal 1 is disconnected from the data block receiving unit 300 of the receiving terminal 4 after all the data blocks have been transmitted, and the number 203 of active terminals among the network control information 20 is decremented by one and the process 10 is terminated. The processes 11, 12 and 13, and the process to be executed by the data block receiving unit 300 will be described later.

In step 101, a plurality of data transfer sets, each of one sending terminal, and one receiving terminal may be simultaneously interconnected. Although a single data transfer set of terminals, i.e., the sending terminal 1 and the receiving terminal 4, are shown in FIG. 2 and it is assumed that the data blocks are sent from the sending terminal 1 to the receiving terminal 4 for simplicity, usually, a plurality of data transfer sets, each of one sending terminal and one receiving terminal, are connected to the communication line 5, and the connection is established for a plurality of data transfer sets in overlapping time bands. When connection is established for a plurality of data transfer sets in overlapping time bands, order of priority of the sets of interconnected terminals may be determined. For example, one data block is sent from the sending terminal to the receiving terminal of a data transfer set having the highest priority, and then one data block is sent from the sending terminal to the receiving terminal of a data transfer set having the second highest priority. Information indicating such order of priority may be added to the network control information 20. When the dividing/sending unit of each data transfer set transfers a data block, the dividing/sending unit makes reference to information indicating the current order of priority and the transfer process may be executed when the current order of priority indicates its turn. After the dividing/sending unit has completed the transfer process, the order of priority, i.e., one of the pieces of network control information 20, of the dividing/sending unit may be lowered by a predetermined value.

Figure 4:
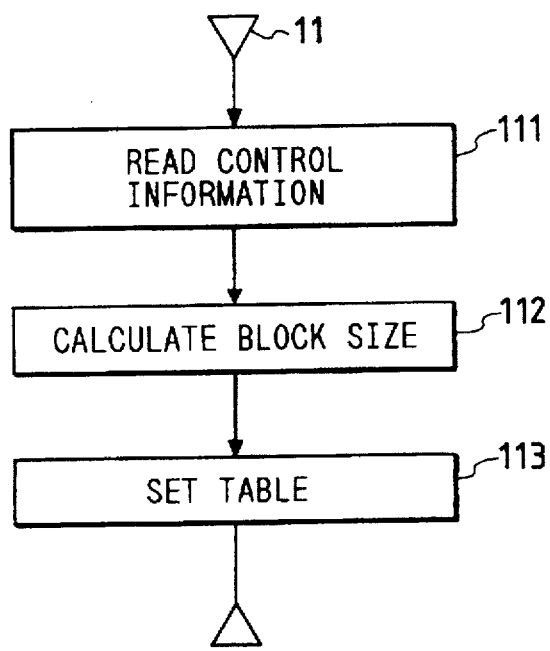
FIG. 4 is a flow chart of a block size determining process to be executed by the data transfer system of FIG. 2.

Referring to FIG. 4 showing the process 11 for block size determination, the process 11 is started when the dividing/sending unit 100 is activated. In step 111, the dividing/sending unit 100 reads allowable delay time 201, transmission rate 207 and float 208 from the network control information 20. In step 112 block size in which the data to be sent out is divided is calculated on the basis of the data read from the network control information 20, using the following expression:

$$dp = \frac{VL(tc - te)}{8} \quad (1)$$

where dp (byte) is block size 211, VL (bit/sec) is transmission rate 207, tc (sec) is allowable delay time 201 and te (sec) is float 208.

Although float 208 need not necessarily be taken into consideration in calculating block size 211 using expression (1), it is preferable to take float 208 into consideration in determining block size 211. Generally, float 208 is not less than zero and may be empirically determined beforehand to give an allowance to the time of occupancy of the communication line 5 by a data block, taking into consideration the allowable delay time 201. In step 113, the calculated block size is set to the block size 211 included in the sender control information 21 and the process 11 is terminated. The allowable delay time 201, the transmission rate 207 and the float 208 are values inherent to the communication line 5 and may be determined when setting up the sending terminal 1 and the receiving terminal 4 or when constructing the data transfer system, or these values may be stored in the storage device, such as a hard disk, of the terminal 2 and may be read from the storage device when the terminals 1 and 4 are connected to the power source or when the same are set up.

Figure 5:
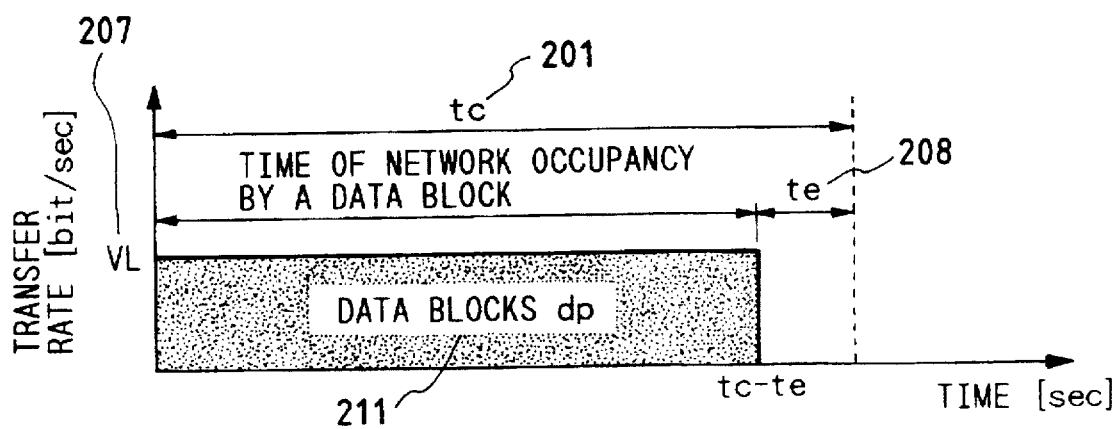
FIG. 5 is a diagram of assistance in explaining the principle of block size determination on which the data transfer system of FIG. 2 determines block size.

A process for forming expression (1) will be described with reference to FIG. 5 showing a diagram of assistance in explaining the principle of block size determination on which the data transfer system in the first embodiment determines block size, in which time (sec) is measured to the right on the horizontal axis and transmission rate (bit/sec) is measured upward on the vertical axis. The explanation will be made on an assumption that the first embodiment operates, for example, in a communication mode in which the Ethernet operates, in which terminals in data transmitting operation occupy the communication line 5, as one example of data communication system using the communication line 5. Naturally, the data transfer system may operate in other communication modes.

Suppose that allowable delay time tc and float te are fixed as shown in FIG. 5. When the sum of the time for which the data block occupies the communication line 5 and the float te is not longer than the allowable delay time tc 201, the data block can be transferred without affecting communication between other terminals. Therefore, the block size 211 of the data block must, at the maximum, correspond to a shaded area of VL×(tc–te) taking into consideration the transmission rate VL inherent to the communication line. The denominator, 8 in expression (1) is used for converting block size expressed in bits into block size expressed in bytes. Generally, data blocks having a greater block size can be transferred at a higher transmission efficiency when data blocks are transferred in a packet mode. Therefore, the shaded area is used as the block size 211.

Figure 6:
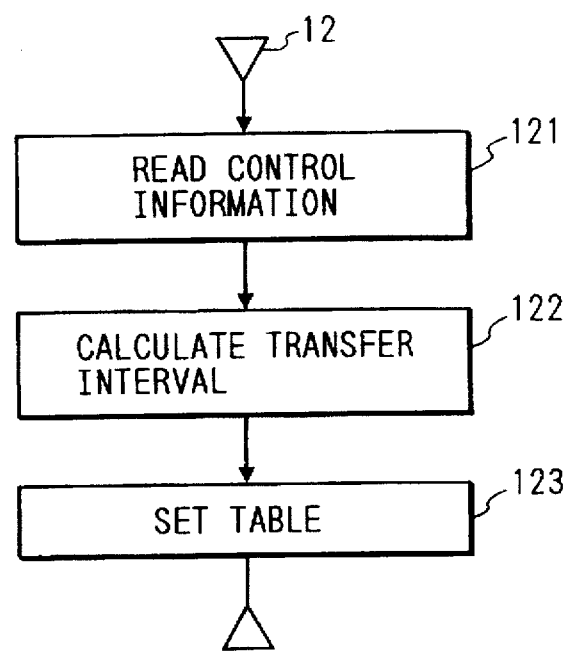
FIG. 6 is a flow chart of a transfer time interval determining process to be executed by the data transfer system of FIG. 2.

The process 12, i.e., a transfer time interval determining routine, will be described hereinafter with reference to FIG. 6. The process 12 is started when the dividing/sending unit 100 is activated. In step 121, the dividing/sending unit 100 reads allocated transmission bandwidth 202, the number 203 of active terminals and nontransmission detection time 209 from the network control information 20, and reads block size 211 from the sender control information 21. In step 122, the dividing/sending unit 100 calculates transfer time interval on the basis of those data read from the network control information 20 and the sender control information 21, using the following expression:

$$td = ti + 8dp\frac{C}{Vd} \quad (2)$$

where td (sec) is transfer time interval 212, Vd (bit/sec) is allocated transmission bandwidth 202, dp (byte) is block size 211, C is the number 203 of active terminals and ti (sec) is nontransmission detection time 209.

In step 123, the dividing/sending unit 100 sets the calculated transfer time interval to initial transfer time interval 212 and the transfer time interval 214, and then the process 12 is terminated.

The allocated transmission bandwidth 202 and the nontransmission detection time 209 are fixed values inherent to the communication line 5. The allocated transmission bandwidth 202 and the nontransmission detection time 209 may be set beforehand, for example, when setting up the terminals 1 and 4 or when constructing the data transfer system, or may be stored in the storage device, such as a hard disk, of the terminal 2 and read from the storage device when the terminals 1 and 4 are connected to the power source or when the terminals 1 and 4 are set up. The number 203 of active terminals is updated whenever necessary every time the dividing/sending unit 100 establishes the connection of a set of terminals (step 101, FIG. 1) and every time the dividing/sending unit 100 disconnects a set of terminals (step 103, FIG. 1).

A process for forming expression (2) will be described with reference to FIG. 7 showing a diagram of assistance in explaining the principle of transfer time interval determination on which the data transfer system in the first embodiment determines transfer time interval.

As mentioned above, it is supposed that the first embodiment of the present invention operates, for example, in a communication mode in which the Ethernet operates, in which terminals in data transmitting operation occupy the communication line 5, as one example of data communication system using the communication line 5. Naturally, the data transfer system may operate in other communication modes.

A transmission bandwidth specified by the allocated transmission bandwidth 202 and set as a piece of network control information 20 must be guaranteed (a transmission bandwidth specified by the allocated transmission bandwidth 202 does not exceed an upper limit) when a plurality of terminals are in dividing/sending operation, not to mention when a single terminal is in dividing/sending operation. The transmission bandwidth specified by the allocated transmission bandwidth 202 must be allocated to a plurality of terminals so that the upper limit of the transmission bandwidth allocated to the terminal does not exceed the transmission bandwidth specified by the allocated transmission bandwidth 202.

Figure 7A:
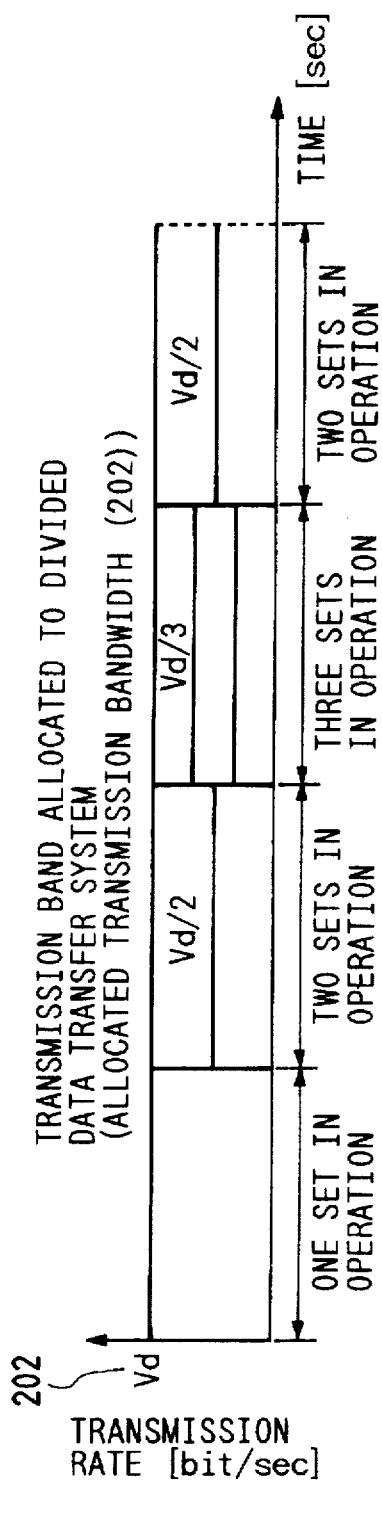
FIGS. 7(a) and 7(b) are diagrams of assistance in explaining the principle of transfer time interval determination on which the data transfer system of FIG. 2 determines transfer time intervals at which data blocks are to be transmitted.
Figure 7B:
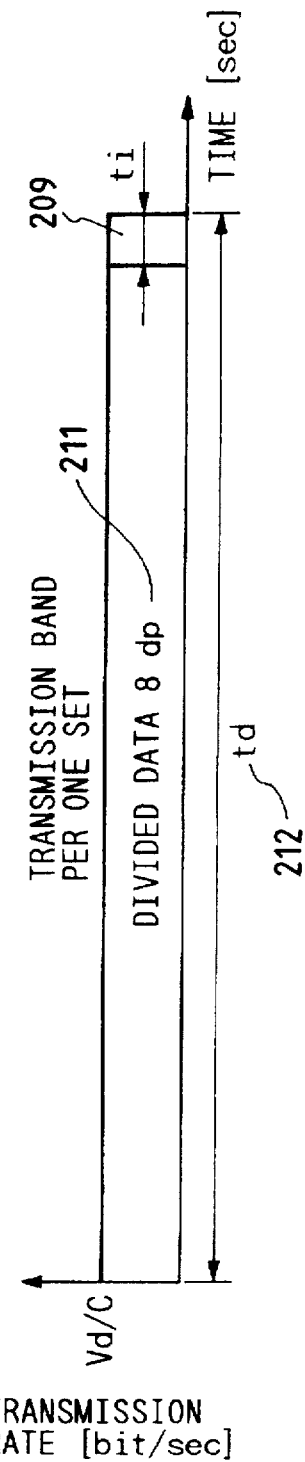

The allocation of the transmission bandwidth will be described below with reference to FIGS. 7(a) and 7(b). When two terminals are simultaneously in data block transfer operation, a transmission bandwidth available for each terminal is ½ of the allocated transmission bandwidth 202. When three terminals are simultaneously in data block transfer operation, a transmission bandwidth available for each terminal is ⅓ of the allocated transmission bandwidth 202. Practically, the Ethernet or the like transmits data in a time-sharing transmission mode and does not divide the transmission bandwidth in the manner as shown in FIG. 7(a), which reduces transmission rate for each terminal. As shown in FIG. 7(b), td=dp(C/Vd)+ti to transmit data blocks efficiently in a transmission bandwidth Vd/C virtually allocated to one terminal. Expression (2) expresses this relation. Although a transfer time interval td including a nontransmission detection time ti is preferable, a transfer time interval td not including a nontransmission detection time ti may be used.

Figure 8:
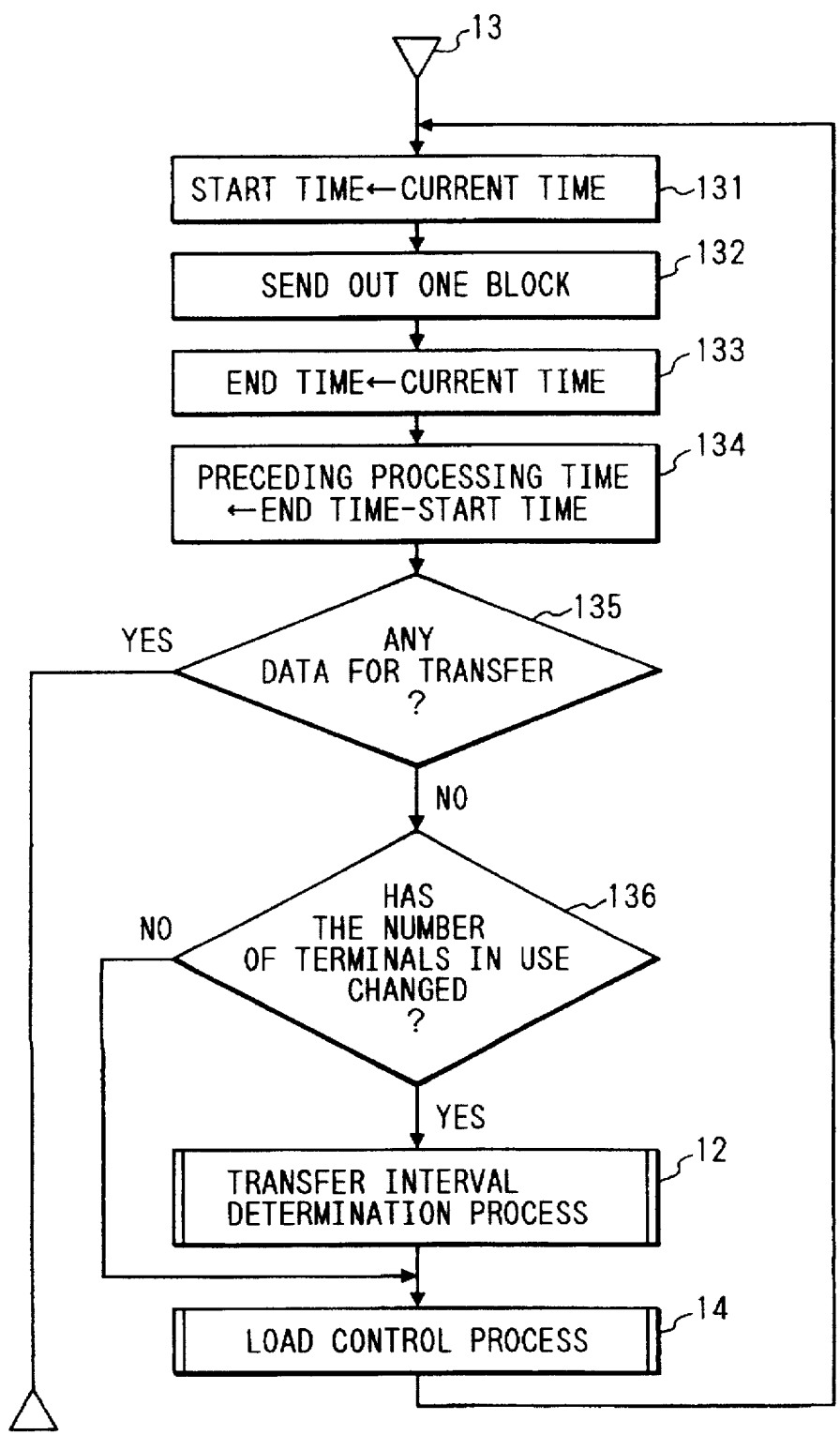
FIG. 8 is a flow chart of a transfer/load control process to be executed by the data transfer system of FIG. 2.

The process 13, i.e., a transfer/load control routine, will be described with reference to FIG. 8. The process 13 is started when the dividing/sending unit 10 is activated. In step 131, current time indicated by the clock of the sending terminal 1 is stored as starting time at which data block transfer cycle for transferring one data block of the block size determined by the process 11 among data blocks formed by dividing data fetched from the sending file unit 50 is stored in the RAM of the sending terminal 1. In step 132, one data block of the block size determined by the process 11 is transferred to the receiving terminal 4. In step 133, current time indicated by the clock of the terminal 1 is stored as ending time at which data block transfer cycle is terminated in the RAM of the sending terminal 1. In step 134, the starting time is subtracted from the ending time to determine a present processing time and the present processing time is stored in the RAM of the sending terminal 1. In step 135, a query is made to see if all the data blocks to be transferred have been transferred. The process 13 is terminated if the response in step 135 is affirmative or the process goes to step 136 if the response in step 135 is negative. The number of data blocks formed by dividing the data to be transferred is known. Therefore, it is possible to count the number of transferred data blocks by a counter and to decide that all the data blocks have been transferred when the count of the counter coincides with the known number of data blocks. In step 136, a query is made to see if the number 203 of active terminals counted in the process 10 or in step 14 for executing a process 14 for load adjustment has changed since the last calculation of the transfer time interval by the process 12. The process 12 (FIG. 8) is executed to set an initial transfer time interval 212 again and to calculate the transfer time interval again and then process 14 is executed if the response in step 136 is affirmative or the process 14, i.e., the load adjusting process, is executed, and then the process returns to step 131 if the response in step 136 is negative.

Thus, the process 13 is repeated until all the data blocks formed by dividing the data to be sent from the sending file unit 50 are transferred to the receiving terminal 4.

Figure 9:
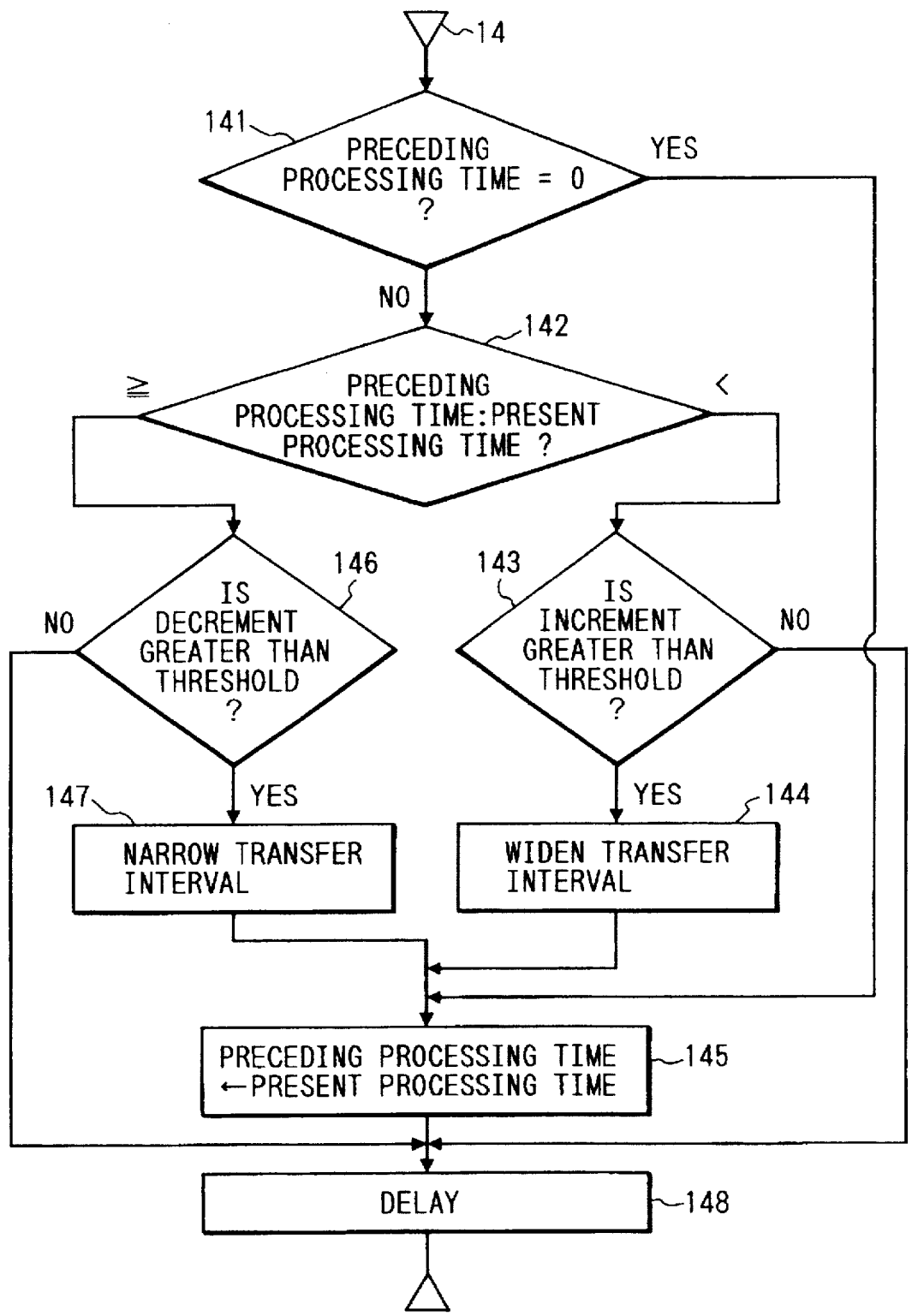
FIG. 9 is a flow chart of a load adjusting process to be executed by the data transfer system of FIG. 2.

The process 14 for load adjustment to be executed by the first embodiment will be described with reference to FIG. 9. A query is made in step 141 to see if the data block transfer cycle time spent in the last data block transfer cycle and included in the sender control information 21 is zero. Step 145 is executed if the response in step 141 is affirmative or step 142 is executed when negative. In step 142, the new data block transfer cycle time determined in step 134 of the process 13 (FIG. 8) and the last data block transfer cycle time 213 are compared. Step 143 is executed if the new data block transfer cycle time is greater than the last data block transfer cycle time or step 146 is executed if the new data block transfer cycle time is not greater than the last data block transfer cycle time. In step 143, an increment in the new data block transfer cycle time relative to the last data block transfer cycle time is calculated, and then the increment is compared with a predetermined increment threshold 204 included in the network control information 20. Step 144 is executed if the increment is greater than the increment threshold 204 or step 148 is executed if the increment is not greater than the increment threshold 204. In step 144, the transfer time interval 214 is increased by a predetermined increment so that the increased transfer time interval 214 does not exceeds the upper limit transfer time interval 206 included in the network control information 20, and then the process goes to step 145. The transfer time interval 214 may be increased by a fixed increment every time step 144 is executed. In step 145, the last data block transfer cycle time 213 is updated to the new data block transfer cycle time determined in step 134 of the process 13, and then the process goes to step 148 In step 146, a decrement in the new data block transfer cycle time relative to the last data block transfer cycle time is calculated, and then the decrement is compared with a predetermined decrement threshold 205 included in the network control information 20. Step 147 is executed if the decrement is greater than the decrement threshold 205 or step 148 is executed if the decrement is not greater than the decrement threshold 205. In step 147, the transfer time interval 214 is decreased by a predetermined decrement so that the decreased transfer time interval 214 is not smaller than the initial transfer time interval 212 included in the sender control information 21, and then the process goes to step 145. In step 148, the process is delayed by, for example, a wait process, so that the loop of the process 13 for sending one data block is equal to the transfer time interval 214, and then the process 14 is terminated. Then, the routine returns to step 131 of the process 13 shown in FIG. 8.

Thus, the process 13 for transfer/load control and the process 14 for load control are executed to transfer the data blocks so that the load on the communication line does not exceed the upper limit load of the communication line.

The increment threshold 204, the decrement threshold 205 and the upper limit transfer time interval 206 are values inherent to the communication line 5, which may be set when setting up the data transfer system. Naturally, these values may be stored beforehand in the storage device, such as a hard disk, of the terminal 2 and may be read from the storage device when the terminals 1 and 4 are connected to the power source or set up.

Figure 10:
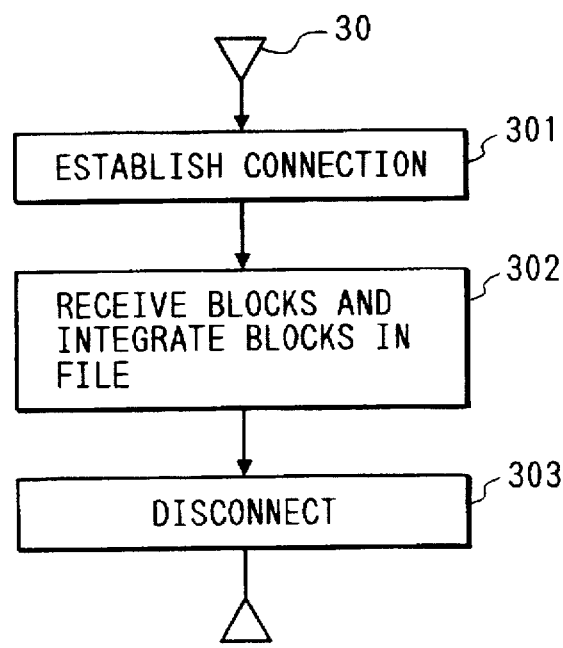
FIG. 10 is a flow chart of a data block receiving process to be executed by the data transfer system of FIG. 2.

A process to be carried out by the data block receiving unit 300 of the receiving terminal 4 of the first embodiment will be described with reference to FIG. 10. In step 301, connection is established in response to a connection establishment request provided by the dividing/sending unit 100 of the sending terminal 1. In step 302, the data block receiving unit 300 receives data blocks successively, integrates the data blocks and, preferably, stores the integrated data in, for example, the receiving file unit 51. In step 303, the connection is broken in response to the connection break request provided by the dividing/sending unit 100 of the sending terminal 1, and then the operation of the data block receiving unit 300 is terminated.

Thus, the first embodiment of the present invention divides the data to be sent out in a block size determined so as to guarantee the allowable delay time, which is the most severe communication quality specification among those demanded by the users of the network, and transfers the data blocks at a transfer time interval determined so as to guarantee the upper limit of the transmission bandwidth for data block transfer. Therefore, the data transfer system of the present invention is able to transfer mass data, suppressing reduction in the ability of data communication between the existing terminals to the least extent.

Second Embodiment

Figure 11:
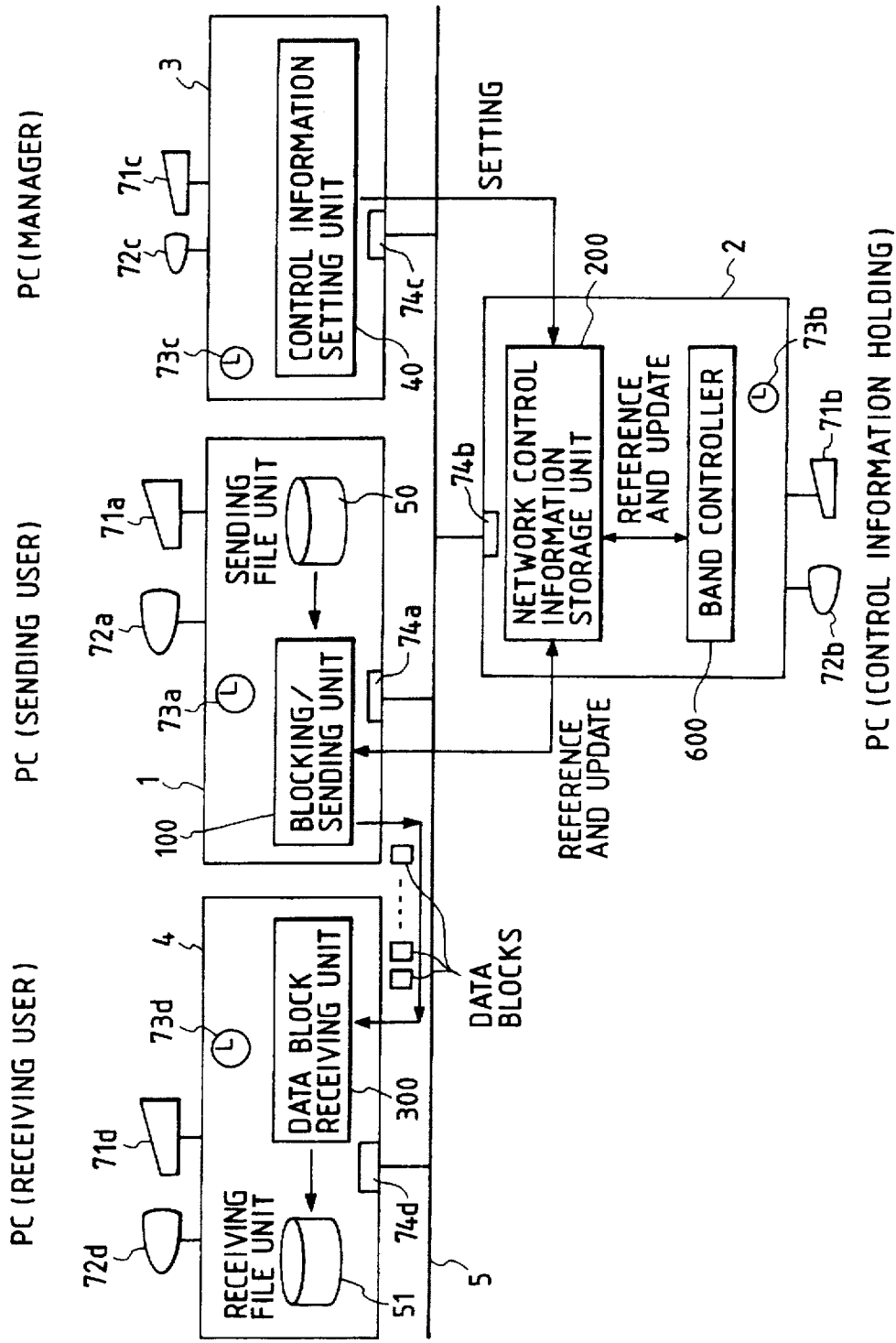
FIG. 11 is a block diagram of a data transfer system in a second embodiment according to the present invention.

A data transfer system in a second embodiment according to the present invention will be described hereinafter with reference to FIG. 11, in which parts like or corresponding to those of the data transfer system in the first embodiment are designated by the same reference characters. The data transfer system in the second embodiment is provided with, in addition to the components of the data transfer system in the first embodiment, a band controller 600 for setting and updating the allocated transmission bandwidth 202 included in the network control information 20. The operation of the band controller 600 and matters in the second embodiment different from those in the first embodiment will be described. The band controller 600 continuously measures the duty ratio, i.e., the ratio of the time for which data is on the communication line for data transfer to a predetermined time period, by an access device 74b, collects and accumulates data representing the variation of the duty ratio with time, statistically processes the accumulated data to calculate the mean values at time points and the like, forms a data base including data representing the time-dependent variation of the duty ratio, and stores the data base in an external storage device. Usually, the data base is updated every day. The band controller 600 may be programmed so as to update the data base at a fixed time, such as 11:55 p.m., of the day. The mode of daily variation of the duty ratio and hence the duty ratio of the communication line 5 at a specified time can be estimated by making reference to the data base. An input device and an output device are connected to the band controller 600, and the output device provides the contents of the data base corresponding to a specified command entered by the input device. The output of the output device may be displayed on a display or printed by a printer. Thus, the manager of the system is able to grasp the contents of the data base and to estimate the mode of daily variation of the duty ratio. The contents of the data base may be used as basic data for producing a table 22, which will be described later. The band controller 600 refers to the data base to grasp the mode of variation of the duty ratio, determines an allocated transmission bandwidth in a real-time mode and updates the allocated transmission bandwidth 202 included in the network control information 20.

Figure 12:
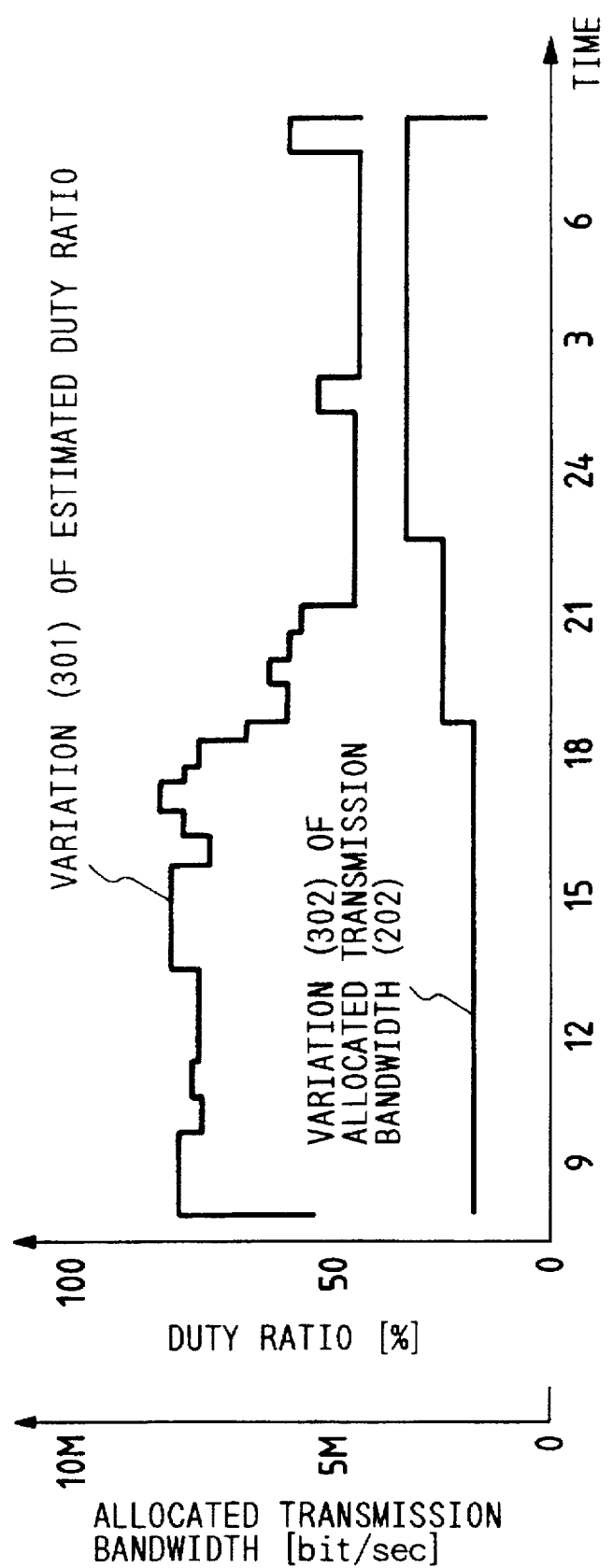
FIG. 12 is a diagram of assistance in explaining the principle of allocated transmission bandwidth determination on which the data transfer system of FIG. 11 determines an allocated transmission bandwidth.

A procedure for determining the allocated transmission bandwidth 202 to be carried out by the band controller 600 will be described with reference to FIGS. 12 and 15. FIG. 12 shows the variation of the duty ratio of the communication line and that of the allocated transmission bandwidth with time, in which time is measured to the right on the horizontal axis, and duty ratio and allocated transmission bandwidth are measured upward on the vertical axis. A curve 301 indicates the variation of the mean duty ratio of the communication line 5 with time, which is an example of the contents of the data base. The band controller 600 reduces the transmission bandwidth to be allocated to the active terminals engaged in data block transfer when the duty ratio of the communication line is small, and widens the transmission bandwidth to be allocated to the active terminals engaged in data block transfer when the duty ratio of the communication line is large. A curve 302 indicates the variation of the allocated transmission bandwidth with time thus allocated to the terminals by the band controller 600 by way of example.

The band controller 600 refers to the table 22, i.e., a transmission bandwidth control table, shown in FIG. 15 and selects a transmission bandwidth corresponding to the duty ratio to determine an allocated transmission bandwidth 202 on the basis of a duty ratio at each time point. A curve 302 indicates the variation of the allocated transmission bandwidth 202 with time by way of example. The table 22 shown in FIG. 15 is stored beforehand in an external storage device connected to the band controller 600. The band controller 600 refers to the table 22 when determining an allocated transmission bandwidth on the basis of a duty ratio at a each time point. The table 22 shows ranges 221 of the duty ratio of the network and corresponding allocated transmission bandwidths 222. The allocated transmission bandwidths 222 of the table 22 may be set beforehand by operating the input device 71 of the terminal 1, 3 or 4 connected to the communication line 5. The output device 72 of the terminal 1, 3 or 4 may be adapted for displaying those set data on the screen.

In the second embodiment, the control information setting unit 40 of the terminal 3 sets only an initial allocated transmission bandwidth as regards the allocated transmission bandwidth 202 and, thereafter, the band controller 600 of the terminal 2 updates the allocated transmission bandwidth 202 to an allocated transmission bandwidth 222 corresponding to the mean duty ratio at the corresponding time point, referring to the table 22. Then, the dividing/ sending unit 100 uses the updated allocated transmission bandwidth 202 for calculating an initial transfer time interval 212 and a transfer time interval 214. The band controller 600 may be included in any one of the terminals connected to the communication line 5. However, it is undesirable to provide the terminal that performs data block sending and receiving operations with the band controller 600 because such band controller 600 needs to execute processes that place heavy loads, such as the continuous measurement of the duty ratio of the communication line, thereon. Therefore, it is preferable to connect an additional terminal provided with the band controller 600 to the communication line 5 as shown in FIG. 11.

Thus, the second embodiment takes the duty ratio of the communication line into consideration in determining the allocated transmission bandwidth and reduces the transmission bandwidth to be used for data block transfer in a time zone on which requests for communication are concentrated. Thus, the influence on the data communication between the other existing terminals can be further effectively suppressed and mass data can be transferred.

Third Embodiment

Figure 13:
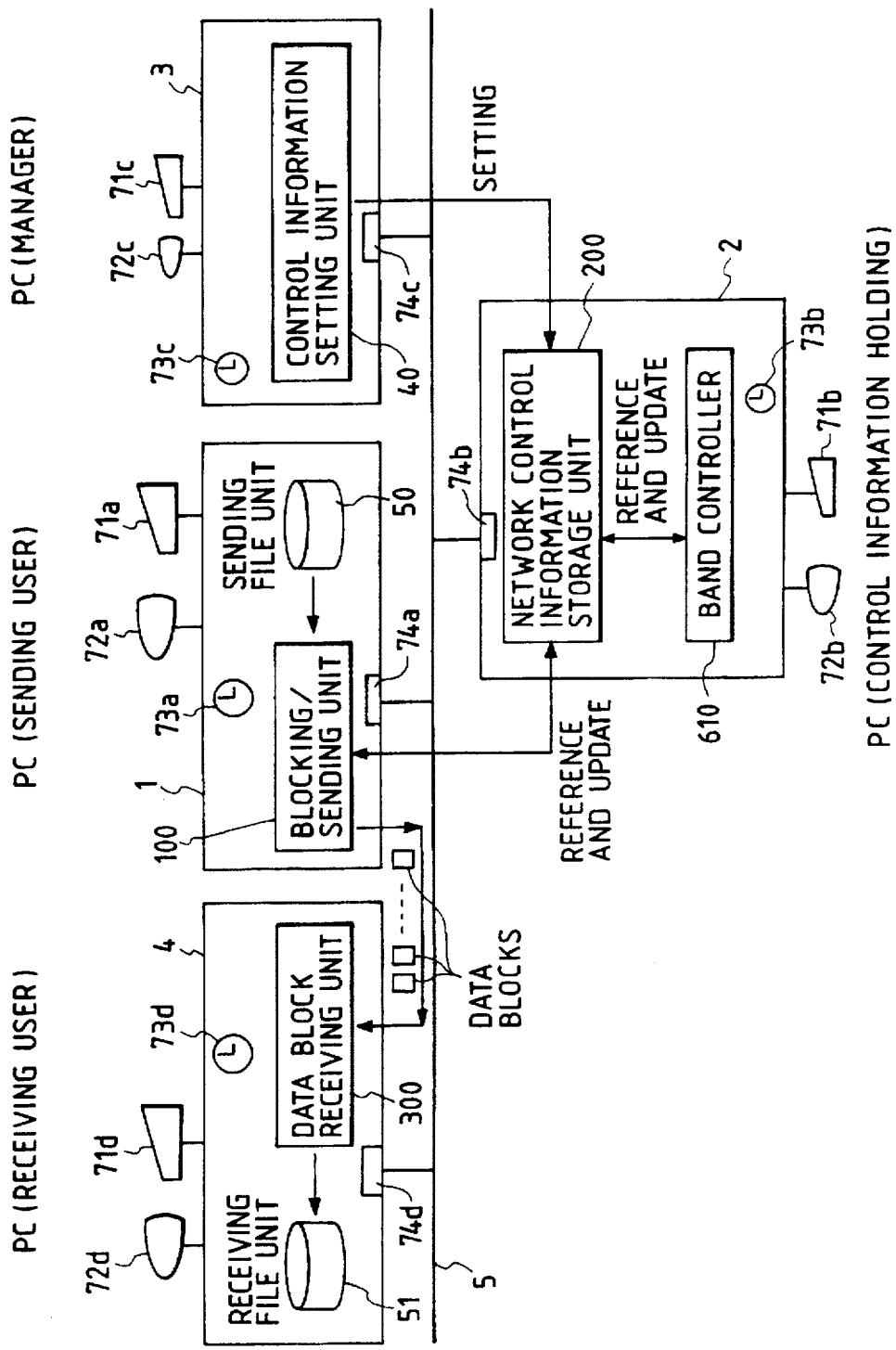
FIG. 13 is a block diagram of a data transfer system in a third embodiment according to the present invention.

A data transfer system in a third embodiment according to the present invention will be described with reference to FIG. 13, in which parts like or corresponding to those of the first embodiment shown in FIG. 2 are designated by the same reference characters. The data transfer system in the third embodiment, similar to the second embodiment, is provided with a band controller 610 for setting and updating the allocated transmission bandwidth 202 included in the network control information 20, in addition to the components of the first embodiment. The operation of the band controller 610 and matters in the third embodiment different from those in the first embodiment will be described. The configuration of the band controller 610 is the same as that of the band controller 600.

The band controller 610 detects the number of active terminals, i.e., terminals that divide data to be sent out into data blocks and transfer the data block, collects and accumulates data representing the daily variation of the number of active terminals with time, statistically processes the accumulated data to calculate the mean number of active terminals at time points, forms a data base including data representing the time-dependent variation of the number of active terminals, and stores the data base in an external storage device. Usually, the data base is updated every day. The band controller 610 may be programmed so as to update the data base at a fixed time, such as 11:55 p.m., of the day. The mode of daily variation of the number of active terminals can be estimated by referring to the data base; that is, it is possible to know the number of active terminals connected to the communication line 5 at a specified time by referring to the data base. An input device and an output device are connected to the band controller 610. When specified commands are entered by operating the input device, the output device provides the corresponding contents of the data base. The output device may display the contents on a screen or may print the contents. Thus the manager of the system is able to grasp the contents of the data base and to estimate the mode of daily variation of the number of active terminals. The contents of the data base may be used as basic data for producing a table 23, which will be described later.

The band controller 610 refers to the data base, grasps the mode of variation of the number of active terminals, determines an allocated transmission bandwidth in a real-time mode and updates the allocated transmission bandwidth 202 included in the network control information 20.

Figure 14:
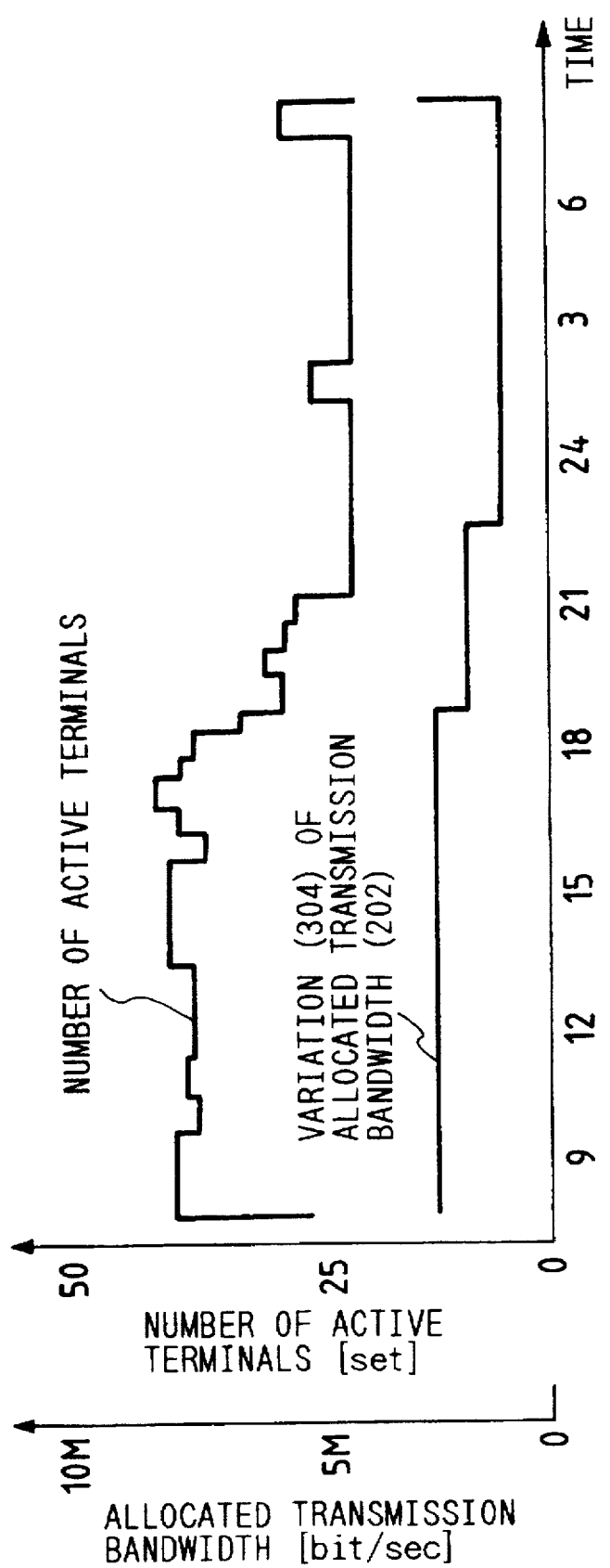
FIG. 14 is a diagram of assistance in explaining the principle of allocated transmission bandwidth determination on which the data transfer system of FIG. 13 determines an allocated transmission bandwidth.

A procedure for determining the allocated transmission bandwidth 202 to be carried out by the band controller 610 will be described with reference to FIG. 14, in which time is measured to the right on the horizontal axis, the number of active terminals and the allocated transmission bandwidth are measured upward on the vertical axis. A curve 303 indicates the variation of the number of active terminals with time, which is an example of the contents of the data base, and a curve 304 indicates the variation of the allocated transmission bandwidth 202 with time. The band controller 610 reduces the transmission bandwidth to be allocated to the active terminals engaged in data block transfer when the number of active terminals is small, and widens the same when the number of active terminals is large. The band controller 610 may determine the allocated transmission bandwidth 202 on the basis of the number of active terminals at each time point by referring to the band control table 23 of the number of active terminals as shown in FIG. 16 and selecting the corresponding transmission bandwidth. A curve 304 indicates the variation of the allocated transmission bandwidth 202 with time by way of example. The table 23 shown in FIG. 16 is stored beforehand in an external storage device connected to the band controller 610. The band controller 610 refers to the table 23 when determining an allocated transmission bandwidth on the basis of the number of active terminals at a corresponding time point. The table 23 shows ranges 231 of the number of active terminals and corresponding allocated transmission bandwidths 232. The allocated transmission bandwidths 232 of the table 23 may be set beforehand by operating the input device 71 of the terminal 1, 3 or 4 connected to the communication line 5. The set data may be displayed on the screen of the output device 72 of the terminal 1, 3 or 4.

In the third embodiment, the control information setting unit 40 of the terminal 3 sets only an initial allocated transmission bandwidth as regards the allocated transmission bandwidth 202 and, thereafter, the band controller 610 of the terminal 2 updates the allocated transmission bandwidth 202 to an allocated transmission bandwidth 232 corresponding to the mean number of active terminals at the corresponding time point, referring to the table 23. Then, the dividing/sending unit 100 uses the updated allocated transmission bandwidth 202 for calculating an initial transfer time interval 212 and a transfer time interval 214. The band controller 610 may be included in any one of the terminals connected to the communication line 5. However, it is undesirable to provide the terminal that performs data block sending and receiving operations with the band controller 610 because such band controller 610 needs to execute processes that place heavy loads, such as the continuous measurement of the number of active terminals, thereon. Therefore, it is preferable to connect an additional terminal provided with the band controller 610 to the communication line 5 as shown in FIG. 13.

Thus, the third embodiment takes the number of active terminals into consideration in determining the allocated transmission bandwidth, widens the allocated transmission bandwidth within a predetermined allowable range when the number of active terminals is large, and successively changes the allocated transmission bandwidth according to the variation of the number of active terminals to effectively suppress the influence on the data communication between the other existing terminals, thereby enabling to achieve mass data transfer.

Thus, according to the present invention, mass data can be divided into data blocks and the data blocks can be transferred by simply connecting the data transfer system provided with only the aforesaid components in accordance with the present invention to the communication system comprising the existing terminals, and the data transfer system of the present invention can be very easily incorporated into the existing communication system at low costs.

As is apparent from the foregoing description, according to the present invention, data to be transferred is divided into data blocks of a block size determined so as to guarantee an allowable delay time, which is the most severe communication quality specification among those required by the users, and the data blocks are transferred through a transmission bandwidth at the transfer time interval determined so as not to exceed a predetermined upper limit. Therefore, even if an AP for transferring mass data, such as video mail, is introduced into the existing communication system, data transfer between the existing terminals of the existing communication system is not affected by the AP.

The data transfer system of the present invention reduces the possibility of delaying the real-time data transfer between the existing terminals to the least extent and enables the transfer of mass data without adversely affecting the communication functions of the existing terminals.

Since the allocated transmission bandwidth is determined taking into consideration the duty ratio of the communication line and the number of active terminals engaged in transferring mass data, mass data can be efficiently transferred without reducing the communication functions of the existing terminals.

Although the invention has been described in its preferred form with a certain degree of particularity, obviously many changes and variations are possible therein. It is, therefore, to be understood that the present invention may be practiced otherwise than as specifically described herein without departing from the scope and spirit thereof.

What is claimed is:

1. A data transfer system for data transfer between a plurality of information processors connected to a communication line, comprising at least one data transfer set of one sending information processor and one receiving information processor among the plurality of information processors;

said sending information processor comprising:
  a block size determining means for determining a block size in which original data to be sent to the receiving information processor is to be divided, on the basis of the transmission rate of the communication line and predetermined allowable delay time for which data communication is allowed to be delayed;

a transfer time interval determining means for determining a transfer time interval at which data blocks are to be transferred, on the basis of the block size determined by the block size determining means, a transmission bandwidth to be used for sending the data blocks of the block size and the number of simultaneously active data transfer sets of one sending information processor and one receiving information processor; and a dividing/transmitting means for dividing the original data to be sent into data blocks of the block size determined by the block size determining means and sending the data blocks to the receiving information processor at the transfer time interval determined by the transfer time interval determining means;

said receiving information processor comprising:

a data block receiving means for receiving the data blocks formed by the dividing/transmitting means and sent thereto and for reconstructing the original data.

2. A data transfer system according to claim 1, wherein the block size determining means determines the block size in which original data to be sent to the receiving information processor is to be divided by using the equation:

$$dp=(VL \times tc)/8$$

where dp (byte) is block size, VL (bit/sec) is the transmission rate of the communication line, and tc is a predetermined allowable delay time (sec) allowed for data communication.

3. A data transfer system according to claim 1 or 2, wherein the transfer time interval determining means determines a transfer time interval at which the data blocks are to be transmitted by using the equation:

$$td=(8 \times dp \times C)/Vd$$

where td (sec) is transfer time interval, dp (byte) is the block size determined by the block size determining means, Vd (bit/sec) is transmission bandwidth to be used for transmitting the data blocks of the block size, and C (set) is the number of simultaneously active data transfer sets.

4. A data transfer system according to claim 1, wherein the sending information processor is provided with a delay monitoring means which measures data block transfer cycle time necessary for transferring one data block every time one data block is transferred, subtracts the data block transfer cycle time of the last data block transfer cycle from the data block transfer cycle time of the current data block transfer cycle to determine the difference, and decides whether or not the difference is greater than a predetermined threshold, and a transfer time interval adjusting means which widens or reduces the transfer time interval according to a predetermined rule.

5. A data transfer system according to claim 4, wherein the predetermined rule specifies that the transfer time interval be widened when the difference is a positive value and greater than a first threshold predetermined for positive differences, and that the transfer time interval be reduced when the difference is a negative value and smaller than a second threshold predetermined for negative differences.

6. A data transfer system according to claim 1, wherein at least one of the plurality of information processors is provided with a duty ratio determining means which determines the duty ratio, which is the ratio of the time for which data is on the communication line for data transfer to a predetermined time period, a storage means for storing duty ratios and corresponding transmission bandwidths for data block transfer in a table, and a transmission bandwidth determining means which refers to the storage means for determining a new transmission bandwidth corresponding to a duty ratio determined by the duty ratio determining means.

7. A data transfer system according to claim 1, wherein at least one of the plurality of information processors is provided with an active data transfer set detecting means which detects the number of active data transfer sets, a storage means which stores the number of active data transfer sets and corresponding transmission bandwidths in a table, and a transmission bandwidth determining means which refers to the storage means for determining a new transmission bandwidth corresponding to the number of active data transfer sets detected by the active data transfer set detecting means.

* * * * *